(No Model.) 4 Sheets—Sheet 1.

F. F. IDE.
DEVICE FOR TESTING BALANCE WHEELS OF WATCHES.

No. 328,848. Patented Oct. 20, 1885.

WITNESSES
Phil C. Masi
Ben. Frigitt

INVENTOR
F. F. Ide.
by Anderson & Smith
his Att'ys (No Model.) 4 Sheets—Sheet 2.

F. F. IDE.

DEVICE FOR TESTING BALANCE WHEELS OF WATCHES.

No. 328,848. Patented Oct. 20, 1885.

WITNESSES
Phill. Masi.
Ben. Fugitt.

INVENTOR
F. F. Ide,
by Audison & Smith
his Attorneys (No Model.) 4 Sheets—Sheet 3.
F. F. IDE.
DEVICE FOR TESTING BALANCE WHEELS OF WATCHES.
No. 328,848. Patented Oct. 20, 1885.

WITNESSES
INVENTOR (No Model.) 4 Sheets—Sheet 4.
F. F. IDE.
DEVICE FOR TESTING BALANCE WHEELS OF WATCHES.
No. 328,848. Patented Oct. 20, 1885.

WITNESSES
Phil C. Masi.
Ben. Fugitt.

INVENTOR
F. F. Ide,
by Anderson & Smith
his Attorneys

UNITED STATES PATENT OFFICE.

FERDINAND F. IDE, OF SPRINGFIELD, ILLINOIS.

DEVICE FOR TESTING BALANCE-WHEELS OF WATCHES.

SPECIFICATION forming part of Letters Patent No. 328,848, dated October 20, 1885.

Application filed September 11, 1885. Serial No. 176,813. (No model.)

*To all whom it may concern:*

Be it known that I, FERDINAND F. IDE, a citizen of the United States, residing at Springfield, in the county of Sangamon and State of Illinois, have invented certain new and useful Improvements in Devices for Testing Balance-Wheels of Watches; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
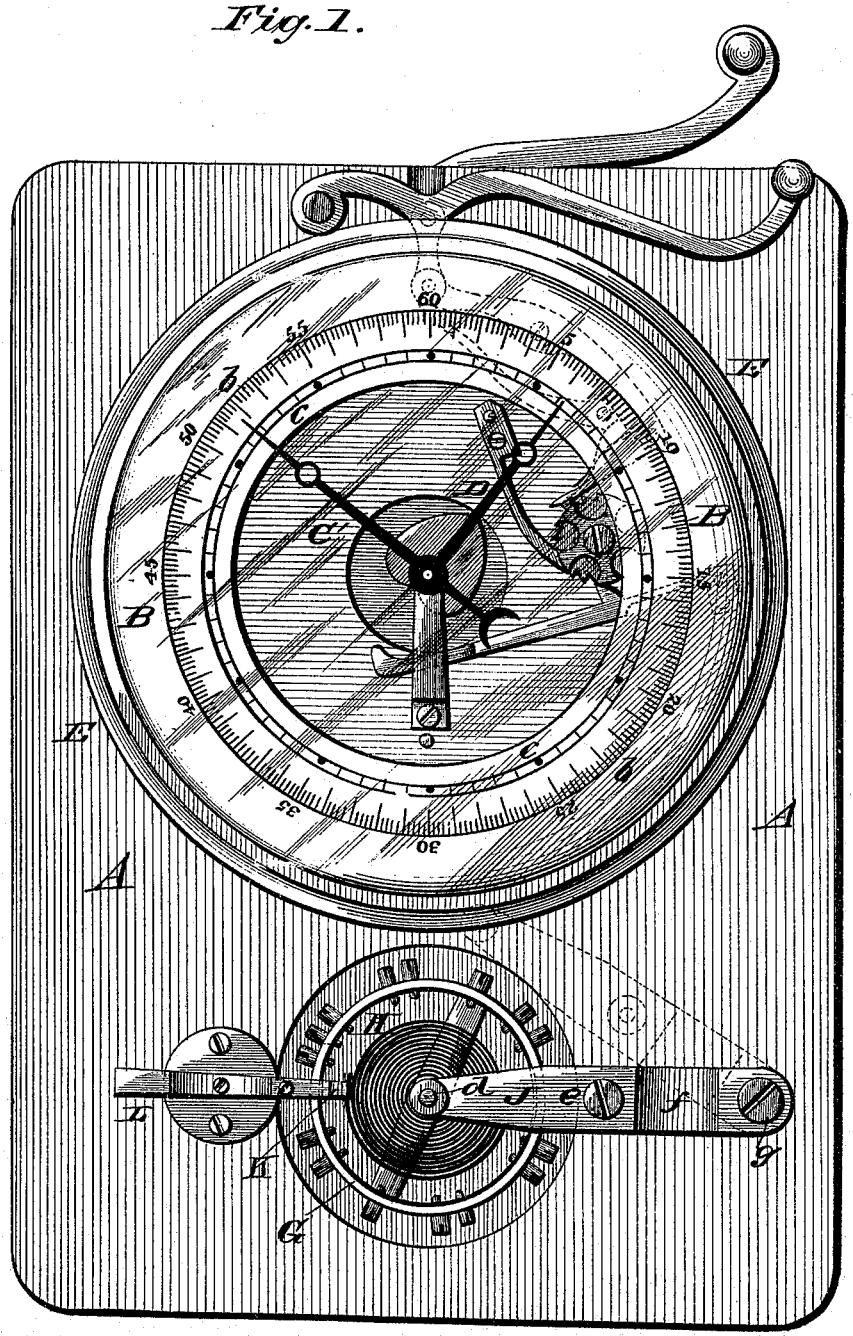
Figure 2:
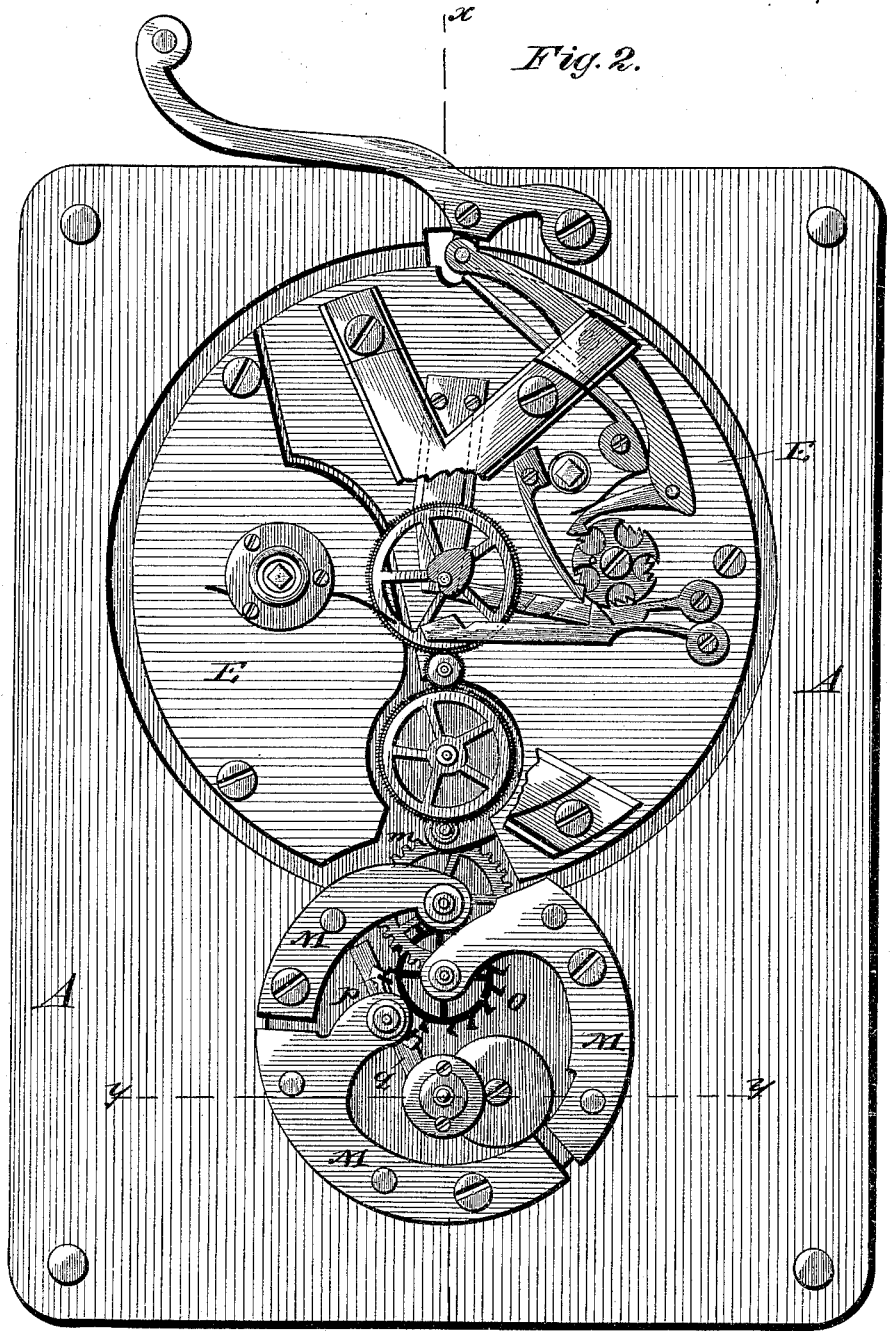
Figure 3:
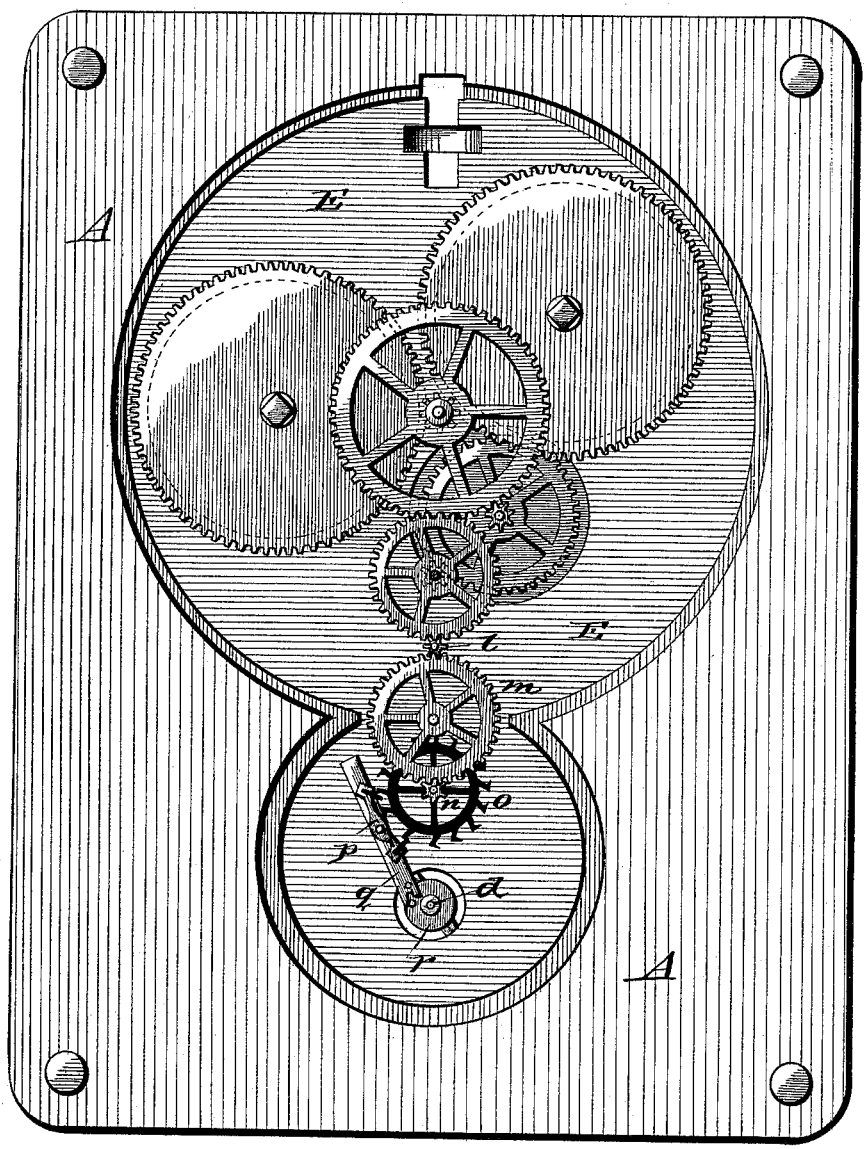
Figure 5:
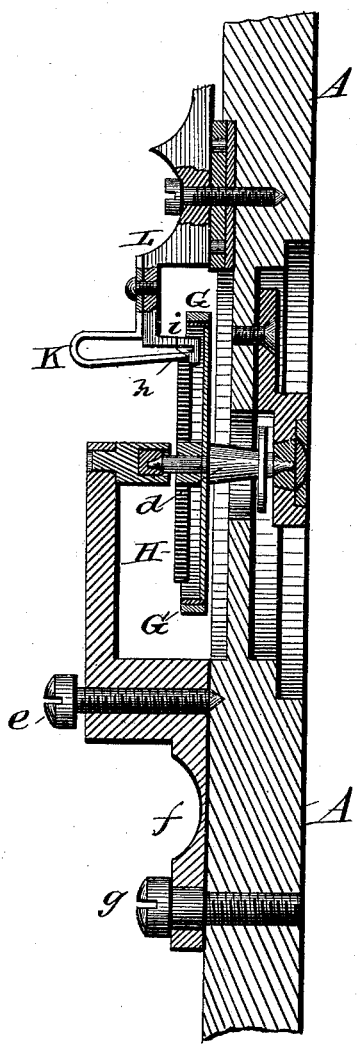
Figure 4:
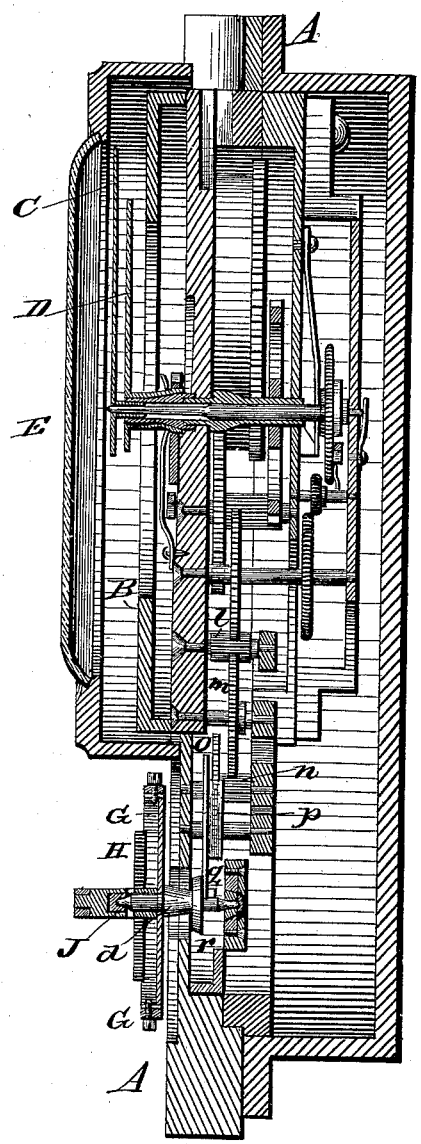

Figure 1 of the drawings is a representation of a front elevation. Fig. 2 is a rear elevation. Fig. 3 is a similar view showing the train. Fig. 4 is a vertical section on line $xx$, Fig. 2; and Fig. 5 is a transverse section on line $yy$, Fig. 2.

The instrument represented in the drawings, and which is shown as secured on a plate, A, is what may be termed a "divided-second watch," or, in other words, a "stop-watch" or "chronometer," which indicates divisions or parts of seconds on its dial B, the outer circular row, $b$, of the divisions representing seconds and their subdivisions, and the inner circular divided scale, $c$, indicating minutes, said instrument being provided with suitable means for instantly stopping and starting it. C indicates the second-hand, and D the minute-hand, of said instrument or apparatus.

Having thus specified the stop time-piece which I employ, it may here be observed that its movements and working details are or may be similar to such time-pieces in ordinary use, so that it will be unnecessary here to refer by letter, or otherwise in detail, to its mechanism or other parts, as shown in the drawings, excepting wherein the same differ in their arrangement and construction. This difference is notably in the disposition of the balance and its immediate attachments or connections, all of which are arranged outside of the plates commonly used and beyond the ordinary case, E, of the watch, and so that the balance-wheel G and balance-spring H can be seen in the same view with the dial B, to one side of which diametrically said wheel and spring are situated, as shown in Figs. 1 and 4. Another point of difference is that the bridge J, which holds the top pivot of the balance-staff $d$, is constructed and attached so that it can be quickly and easily raised from the pivot and turned back or to one side, as shown by dotted in Fig. 1, in order that the balance with its attachments may be quickly and easily removed and replaced, and said bridge afterward be returned to its proper place. Another point, too, is in the means used to hold the balance-spring, which means is constructed to provide for the ready hold and release of said spring when necessary.

To provide for the manipulation or adjustment of the bridge J, as described, said bridge has a holding and adjusting screw, $e$, to adapt it to the staff, and may be of a spring or elastic construction at $f$, and is pivoted in the rear, at $g$, to the stand, whereby it may readily be raised from the top of the balance-staff and be turned away therefrom, and afterward be again adjusted to its normal position, as required. This construction and attachment of said bridge is shown in Figs. 1 and 5, which figures also show the means used to hold and release the balance-spring H, the same consisting of a bent spring, K, secured at its one end to a bridge or support, L, and holding at its free end the outer end of the balance-spring against the wall of an upper step, $h$, which is pendent from the front of the support L.

By pressing the free arm of the spring K inward it is released from its hold on the balance-spring and made to engage with a lower notch or step, $i$, in the support L, whereby the balance-spring is free to be removed, together with the balance-wheel, and to be replaced by another balance-wheel, but same spring, after which the spring K is released to resume its holding position on the balance-spring.

In Fig. 2 M M indicate the plates for holding the mechanism by which motion is transmitted to the balance outside of the regular or dial case of the watch diametrically, the ordinary operating-pinion, $l$, from which such motion is derived, being suitably disposed for the purpose, and gearing with the wheel $m$, arranged to extend beyond the case E, which wheel engages with the pinion $n$ on the arbor of the escapement-wheel o, that extends still further beyond said case and operates the anchor p, attached to the notched or forked arm q, which engages with the jewel on the roller-plate r for giving the necessary vibrating motion to the balance-staff d, as shown in Figs. 2, 3, and 4.

In using the apparatus for ascertaining the governing power of a balance-wheel and springs suitable for it, said wheel G is first now in the apparatus in connection with the standard spring H, and the duration of the balance from time, as shown on the dial B, compared with the chronometer or time-register is noted and compared with a schedule which will show the strength of spring necessary to correct such duration and run the balance on time. Said balance-wheel and standard spring are then removed from the apparatus, the standard spring detached from said wheel, and a proper spring, as shown by the schedule, applied to it, which leaves the balance, with the attached spring, ready for use in a watch or other time-piece. The standard spring is then applied to another balance-wheel and the two inserted in their place in the apparatus (shown in the drawings) for ascertaining the governing power of such wheel and proper spring suitable for it, as in the previous instance, and so on indefinitely for any number of balance-wheels.

The spring-clamp K and movable bridge J provide for the removal and replacement of the balance-wheels and standard spring, as described, in a very simple, rapid, and easy manner.

It may be observed here that the standard spring may at any time, or during the testing of the balance-wheels to be supplied with springs of different strengths, as shown by the schedule, be replaced by a duplicate or counter part, which then becomes the standard spring.

I am aware that a device for rapidly adjusting hair-springs, according to old and common practice, is shown in patent No. 105,467, which practice is to attach the hair-spring permanently to the balance-wheel staff, then pull or push the spring along between a holder until by training a proper length of the spring for each wheel is formed, and then the spring is broken off to preserve the limit so found. This method of adjusting hair-springs to balance-wheels is at all times liable to give a strained or forced combination between the two, as a strong spring an extra length for a light wheel and a light spring shortened up to balance a heavier wheel. All of this is avoided by my method and the use of my device, as by it I adapt each spring to its proper wheel and each wheel to a proper spring without pulling or pushing the spring unnaturally and without breaking them off.

I do not claim in this application my process of testing and grading balance-wheels, and of selecting hair-springs suitably graded to run said balance-wheels to time, as this proves to have been made the subject of my application filed May 12, 1882, Serial No. 61,133.

Having described my invention, what I claim is—

1. The combination, with the balance arranged outside or at one side of the dial of the time-piece or indicating-vibrator, of the bridge which supports the top pivot of the balance-staff, constructed and attached to admit of its being raised and of being swung laterally or back to provide for the removal and replacement of the balance, substantially as specified.

2. The combination, with the balance and its spring arranged outside of or at one side diametrically of the dial of the time-piece or indicating-vibrator, of the spring-clamp, and notched or stepped support for holding the outer end of the balance-spring, and to permit of its ready removal and replacement when required, essentially as specified.

3. The instrument for testing and grading balance-wheels, consisting of a stop-watch having a standard hair-spring and movable bridge adapted to be displaced to permit of the introduction and removal of balance-wheels, and their connection with and disconnection from said hair-spring, substantially as specified.

In testimony whereof I affix my signature in presence of two witnesses.

FERDINAND F. IDE.

Witnesses:
HORACE C. IRWIN,
G. BURKHARDT.